United States Patent [19]

Easter

[11] Patent Number: 5,707,045
[45] Date of Patent: Jan. 13, 1998

[54] AIR SPRING SYSTEM HAVING AN INTEGRAL HEIGHT SENSOR

[75] Inventor: Mark R. Easter, Indianapolis, Ind.

[73] Assignee: Bridgestone/Firestone, Inc., Akron, Ohio

[21] Appl. No.: 708,442

[22] Filed: Sep. 5, 1996

[51] Int. Cl.$^6$ .................................................. B60G 17/00
[52] U.S. Cl. ............................ 267/64.21; 267/64.28; 188/1.11 E
[58] Field of Search ..................... 188/1.11 R, 1.11 E; 267/64.16, 64.28, 64.17, 64.19, 4.21, 64.23, 64.24, 64.22, 64.18; 280/707, DIG. 1

[56] References Cited

U.S. PATENT DOCUMENTS

| | | | |
|---|---|---|---|
| 4,141,572 | 2/1979 | Sorensen | 267/64.21 |
| 4,398,704 | 8/1983 | Buchanan, Jr. et al. | 267/64.21 |
| 4,647,025 | 3/1987 | Gold | 267/64.27 |
| 4,798,369 | 1/1989 | Geno et al. | 267/64.11 |
| 4,802,657 | 2/1989 | Wijnhoven et al. | 188/1.11 E |
| 4,817,922 | 4/1989 | Hovance | 267/64.21 |
| 5,521,497 | 5/1996 | Schneider et al. | 267/64.19 X |

FOREIGN PATENT DOCUMENTS

| | | | |
|---|---|---|---|
| 40 35 784 A1 | 6/1991 | Germany. | |
| 404 244 828 | 9/1992 | Japan. | |
| 2177475 | 1/1987 | United Kingdom | 188/1.11 |

Primary Examiner—Josie Ballato
Attorney, Agent, or Firm—Carmen S. Santa Maria

[57] ABSTRACT

An air spring system adapted to be mounted on a vehicle for absorbing road shocks exerted on the vehicle and for maintaining the vehicle body level with respect to the axles. The air spring includes an end plate and a piston sealingly connected to the open ends of a flexible elastomeric sleeve to form a pressurized fluid chamber therebetween. The flexible elastomeric sleeve rolls over the piston to allow for expansion and contraction of the chamber during shocks. A height sensor is positioned between the sleeve and the piston and in some embodiments includes elements that are molded or embedded within the sleeve and/or piston or both.

23 Claims, 5 Drawing Sheets

AIR SPRING SYSTEM HAVING AN INTEGRAL HEIGHT SENSOR

BACKGROUND OF THE INVENTION

1. Technical Field

The invention relates to vehicle suspensions and more particularly to an air spring for absorbing road shocks exerted on the vehicle and for maintaining the vehicle body level with respect to the axles, where the air spring includes an integral height sensor. Specifically, the invention relates to an air spring with a height sensor that is integrally embedded in the flexible elastomeric sleeve and/or the outer side wall of the piston.

2. Background Art

Pneumatic springs, commonly referred to as air springs and/or air struts, have been used with motor vehicles for a number of years to provide cushioning between the movable parts of the vehicle, primarily to absorb shock loads impressed on the vehicle axles by the wheel striking an object in the road or falling into a depression. These air springs usually consist of a flexible elastomeric sleeve or bellows containing a supply of compressed air having one open end connected to an end plate and a second open end sealing connected to a piston. The piston is generally mounted on the vehicle axle and includes a portion which extends into the fluid chamber whereby the piston causes compression and expansion within the fluid chamber as the vehicle experiences uneven road conditions and other shocks whereby the compressed air within the chamber absorbs the shock. Overall, these air springs function to maintain a predetermined spacing between the vehicle components, such as between the tires and wheel wells, as well as maintaining the vehicle body at a predetermined level above the vehicle axle and maintaining the vehicle body level with respect to the axles or not level in a predetermined and desirable manner. Basically, air springs function to withstand the road shock loads exerted thereon by providing sufficient jounce or collapse movement as well as rebound or expanded movements of the air spring without damaging the flexible sleeve and connected end members. This insures the proper damping characteristics so as to protect numerous mechanical components and systems on the motor vehicle from damaging contact with each other and with the road.

It is critical that the proper amount of pressurized fluid be contained within the flexible sleeve so that the air spring will perform satisfactorily thereby insuring the proper damping so that undesired contact of vehicle parts with other parts or the road is eliminated. In addition, the proper damping serves to absorb shock thereby providing a better ride as well as prohibiting or reducing jouncing of the vehicle. Current air spring designs either incorporate a sealed flexible sleeve with a constant quantity of pressurized fluid trapped within the chamber, or include pressurized air systems for supplying makeup air into the chamber and/or exhausting extra air from the chamber in order to maintain the desired amount of air in the chamber.

It has recently become desirable to control the automatic control systems for supplying makeup air into the chamber and/or exhausting surplus air from the chamber using height sensors or other components to assist and maintain the desired spacing between the end members of the air spring. It has long been known that the height of the suspension can be adjusted by increasing the pressure in the air spring but such adjustments in past have generally always been done manually with the vehicle in a stopped position. Since it is much more desirable to be able to perform continuous adjustments and particularly continuous adjustments while the vehicle is in motion, it is necessary to be able to detect the existing height condition and compare it to the preferred or standard height condition. This ability to make continuous adjustments while the vehicle is in motion would allow the vehicle user to meet numerous goals including maximal absorption of road shock, maintenance of the vehicle body level with respect to the axles, and maximum aerodynamics based upon a lower vehicle profile by allowing height adjustment of the vehicle at high speeds on smooth roads versus lower speeds on rough roads.

Various mechanical systems have attempted to achieve this desired result with varying degrees of success. It has been found that the mechanical systems for measuring the distance between two points of the suspension which are relatively moveable have inherent reliability problems based upon wear and tear over the long service lives of suspension members. Furthermore, the wear and tear of these systems based upon mechanical engagement as well as other environmental conditions such as corrosion, ultimately result in improper readings thereby requiring replacement or repair.

In response, air spring systems have developed which use electronic components such as ultrasonic transducers and photoelectric cells. The use of these electronic components eliminates the wear concern of a mechanical system, but still does not address environmental concerns of mounting the electronic components in an exterior manner on the air spring except where the electronic component has been mounted completely within the air spring such as in U.S. Pat. No. 4,798,369, wherein an ultrasonic transducer is mounted on the end plate within the fluid chamber and transmits ultrasonic signals through the fluid chamber toward the piston and picks up reflected signals therefrom. These internal systems are typically complex and lack adjustment capability due to their internal location. In addition, these internal components may not provide the level of reliability and accuracy desired by the vehicle user.

Although certain devices use height sensors for adjusting the height or spacing between components, none of these prior art devices disclose or suggest use of such a height sensor which integrally conceals and sets within the body of an air spring or shock absorber in connection with a vehicle air spring system, where the integral height sensor is not mounted within the fluid pressure chamber where access is difficult.

Therefore, the need exists for an air spring leveling system which is integrally mounted within the air spring thereby eliminating external mounting requiring separate devices, where the principal detecting components are located externally of the fluid pressure chamber but integrally within the air spring system to accurately determine and maintain the correct axial spacing of the end members of the suspension system, thereby eliminating contacting mechanical height sensing components or electrical components mounted within the fluid pressure chamber.

SUMMARY OF THE INVENTION

Objects of the invention including providing an improved air spring for mounting on motor vehicles in which an integral low cost height sensor is operatively position thereon to control the fluid pressure within the fluid pressure chamber of the flexible elastomeric sleeve so as to absorb road shock forces exerted on the vehicle and that the proper spacing of the vehicle body from the axle is maintained.

Still another objective of the invention is to eliminate parts and wiring from the overall air spring system while still providing height sensing.

Still another but similar objective of the invention is to eliminate the mounting of the height sensor devices as was previously required by the prior art designs.

A further objective of the present invention is to provide an improved air spring with a height sensor thereon, utilizing simpler electronic or optical sensors.

A still further objective of the present invention is to provide an air spring with a height sensor that is more reliable than current designs, and is simpler to assemble and to use than current designs.

Still other advantages and benefits of the invention will become apparent to those skilled in the art upon a reading and understanding for the following summary and detailed description.

Accordingly, the objectives and advantages are obtained by the improved air spring of the present invention, the general nature of which may be stated as including an air spring comprising a pair of end members located in a generally axial spaced relationship when in an at-rest position. The end members are adapted to be mounted on spaced apart portions of a vehicle and are movable towards and away from each other to absorb road shocks as the vehicle encounters the road depressions and obstructions and to maintain the spaced apart vehicle portions at a predetermined spaced relationship when in the at-rest position. The air spring further including a fluid pressure chamber formed between the end members by a flexible elastomeric sleeve having opposed open ends sealingly connected to the end members respectively. The flexible elastomeric sleeve being foldable partially over one of the end members thereby defining a covered region of the folded over end member and a corresponding covering region on the flexible elastomeric sleeve. The air spring further including a sensor for sensing relative distance between the end members and selectively producing a height sensed signal responsive thereto. The sensor positioned within at least one of the covered region and the covering region when the system is in the at-rest position. The air spring further including a pressurized fluid source fluidly connected to the fluid pressure chamber and electrically connected to the sensor, the pressurized fluid source controlled by the height sensed signal from the sensor for regulating the amount of fluid within the pressure chamber by controlling fluid entry and exit to maintain a predetermined axial separation between the end members when in the at-rest position.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

BEST MODE FOR CARRYING OUT THE INVENTION

Figure 1:
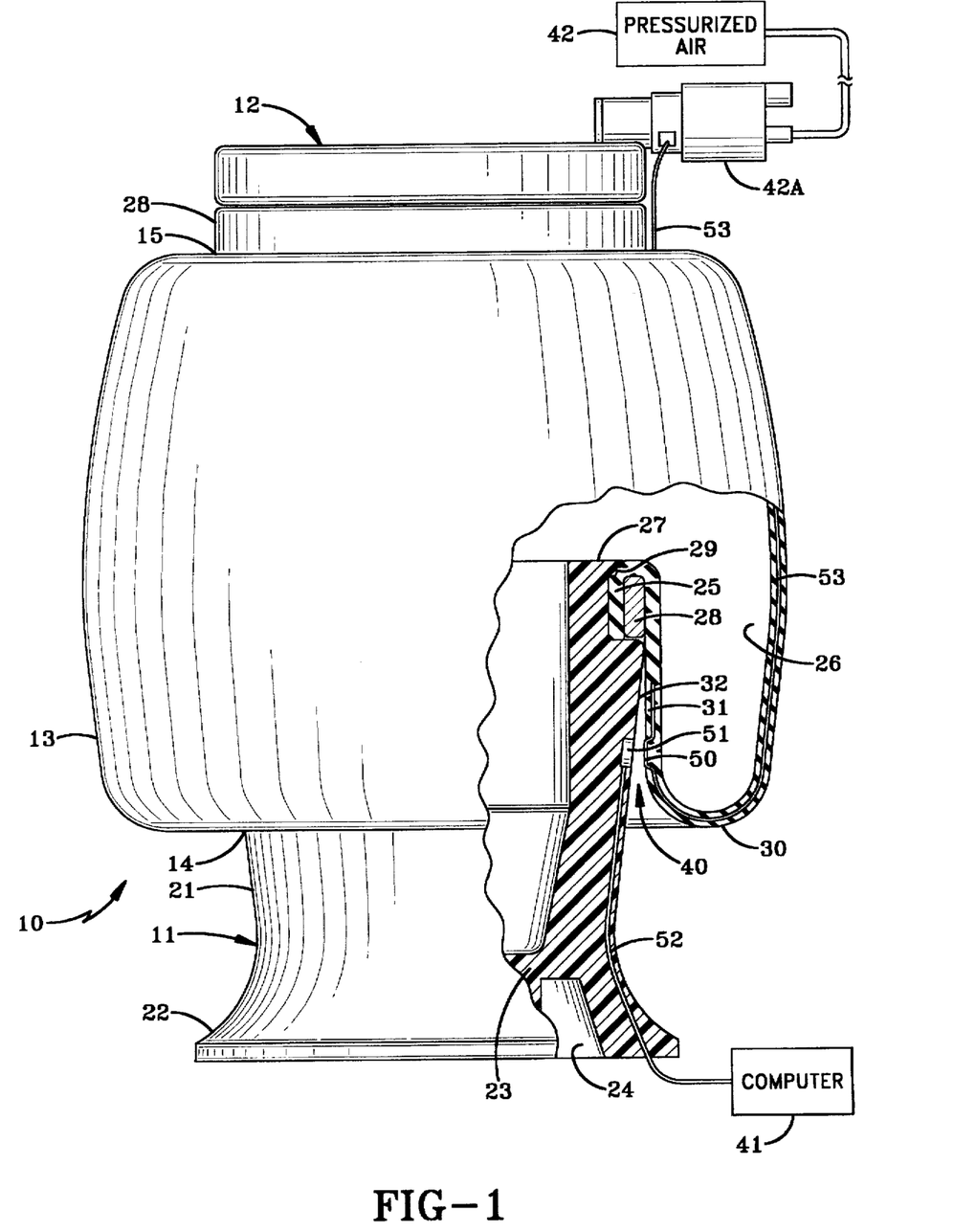
FIG. 1 is an elevational view with portions broken away and in section showing a first embodiment of an air spring containing the integral height sensor.

FIG. 1 shows a first embodiment of an improved air spring, indicated generally at 10. Air spring 10 is shown in a normal at-rest position and includes a pair of end members, indicated generally at 11 and 12, with end member 11 being a piston and end member 12 being an end plate. Air spring 10 further includes a flexible elastomeric sleeve 13 having a pair of open ends 14 and 15 in fluid tight clamping engagement with piston 11 and end plate 12, respectively. The particular construction of the end members may vary from the construction as described below and shown in the drawings, but all possible constructions serving to form an air spring are contemplated herein as would be well know by one skilled in the art.

Piston 11 includes a generally cylindrical outer side wall 21 terminating in an outwardly flared end portion 22. Piston 11 further has a central annular base or support structure 23 provided with a plurality of holes or other mounting means 24 for mounting piston 11 on a vehicle component. Overall, the particular construction of pistons in air spring systems is well known in the art and therefore the specific details thereof are described in further detail. One such possible construction of a piston is shown in U.S. Pat. No. 4,798,369 which is hereby incorporated by reference.

End plate 12 is any plate sealably attachable to open end 15 of flexible elastomeric sleeve 13 and mountable to another part of the vehicle spaced from the part of the vehicle to which piston 11 is attached. Similar to the above discussion on piston 11, end plates 12 are well known in the art and thus are not described in further detail. One example of an end plate is shown in U.S. Pat. No. 4,798,369 which is hereby incorporated by reference.

Flexible elastomeric sleeve 13 extends from piston 11 to end plate 12 in a generally annular manner with each end 14 and 15 having an end edge or lip 25 thereon for sealable engagement to piston 11 and end plate 12, respectively. Sealable connection defines a fluid pressure chamber 26 within sleeve 13 extending from piston 11 to end plate 12. Specifically, end edge 25 envelops a reduced diameter portion or neck 27 of either piston 11 or end plate 12 whereby an annular ring 28 provides a fluid type clamping engagement of end edge 25 to the piston 11 or end plate 12, respectively. The neck 27 preferably is provided with an outwardly extending rim 29 which pinches sleeve 13 thereby holding ring 28 in its proper position by restricting the ring movement off of the neck.

The piston 11 is sized and positioned, and the flexible sleeve 13 is sufficiently flexible and resilient, such that the flexible sleeve folds or rolls over and around the piston in a well known manner often referred to as a rolling diaphragm or lobes thereby defining slack in the sleeve to allow for extra distance between piston 11 and end plate 12 as needed during extended separation of the piston and end plate. This folding or rolling lobes also allows surplus sleeve to be dissipated when piston 11 and end plate 12 converge toward one another. The result of this rolling motion is a fold or lobe 30 in the sleeve whereby the sleeve has a portion referred to as the covering portion 31 that is adjacent and substantially covering a portion of the piston, said portion referred to as the covered portion 32.

In accordance with the invention, a height sensor, indicated generally at 40, is mounted either or both on the outer side wall 21 of the piston 11 and the outer surface of flexible elastomeric sleeve 13 as described in more detail below. The height sensor provides a means for determining whether or not there is an error in the height or axial separation between piston 11 and end plate 12 when compared to a predetermined desirable spacing. In a preferred embodiment, the height sensor 40 is connected either electrically or by radio or other wireless means to a computer 41 which, in turn, is connected to and controls a pressurized fluid source, such as a compressor 42, through a solenoid 42A. The computer provides a means for making the actual determination as to whether there is an error in the height or axial separation whereby the computer, once a determination has been made that an error in the height or axial separation between the end members of the air spring is present, can activate the pressurized fluid source 42 to supply or exhaust pressurized fluid to or from within fluid pressure chamber 26 to correct said error through control solenoid 42A.

Numerous embodiments of height sensor 40 are presented herein in FIGS. 1–7 as various devices including as a contact switch, a magnetic proximity switch, an optical switch, and a microchip, all of which are subject to various constructions, designs, and positions. Specifically, in the preferred embodiment, the height sensor 40 comprises a transmitter 50 and a target 51. The transmitter 50 and/or target 51 is electrically connected to the computer 41 which controls the pressurized fluid source 42 by an electric source, such as a battery or AC/DC source. In the alternative, the target and/or transmitter may be wirelessly connected to any of the above.

In one embodiment, the transmitter is a magnetic proximity switch for measuring magnetic or electric fields and in some embodiments their intensities, and the target is any magnetized object. In another embodiment, the transmitter is an optical transmitter capable of transmitting light in either a predetermined frequency or in any known manner, and the target is any light receiver such as a photoelectric diode. Similarly, the transmitter could be a combined light transmitter and receiver where the target is merely a reflector of any kind. In a third embodiment, the transmitter is a sensor or switch that is actuated by the target which is merely a stop or other mechanical impediment that mechanically interacts with said transmitter. In a fourth embodiment, the transmitter is a microchip and the target is any means capable of interacting electrically or magnetically with said microchip. In a further embodiment, the transmitter and target may be thin metallic strips of material molded into or affixed on both the sleeve and the piston or is a strip of polymer material containing electrically conductive carbon black, whereby height is sensed by the resistance or "Hall effect" therein. Other embodiments are contemplated hereunder including other sensor devices as are well known to one skilled in the art. Basically, the sensor device is any device that is capable of sensing when a select spot on the sleeve component comes into proximity or contact with a select spot on the piston component, or sensing intensity as the spots approach and/or diverge from one another.

It is also contemplated that more than one height sensor may be used in either vertical alignment, out of vertical alignment such as in opposing relationship on the sleeve, or in some other fashion capable of indicating axial movement of the sleeve 13 with reference to the piston 11.

In the embodiment as is shown in FIG. 1, height sensor 40 comprises transmitter 50 and target 51 and is electrically connected by wire 52 to the computer for controlling air supply 42 and to solenoid 42A by wire 53. The sensor, either the target and/or transmitter is connected to the electric power source. The target 51 is molded, snap-fitted in a slot, or otherwise integrally embedded within piston 11 as is the electrically conductive wire 52 connected thereto. The transmitter 50 is exposed on the outside surface of sleeve 13 and connected to wire 53 which is embedded within flexible sleeve 13 and connected to the solenoid 42A and to computer 41.

In this embodiment, the transmitter is either a magnetic proximity switch that includes a magnetic field reader or an optical switch that transmits light of a certain predetermined wavelength. The target is therefor either a magnetized object, or an optically reflective medium or photoelectric eye depending upon whether the transmitter is magnet or optic. In operation, the transmitter 50 senses divergence of the target away from its directly adjacent position to the transmitter when air spring 10 is moved away from its at-rest as is shown in FIG. 1. As the resistance, light density, or other monitorable property transmitted from the transmitter changes, the computer activates the pressurized fluid source 42 which acts to supplement or remove fluid to or from fluid pressure chamber 26.

Figure 2:
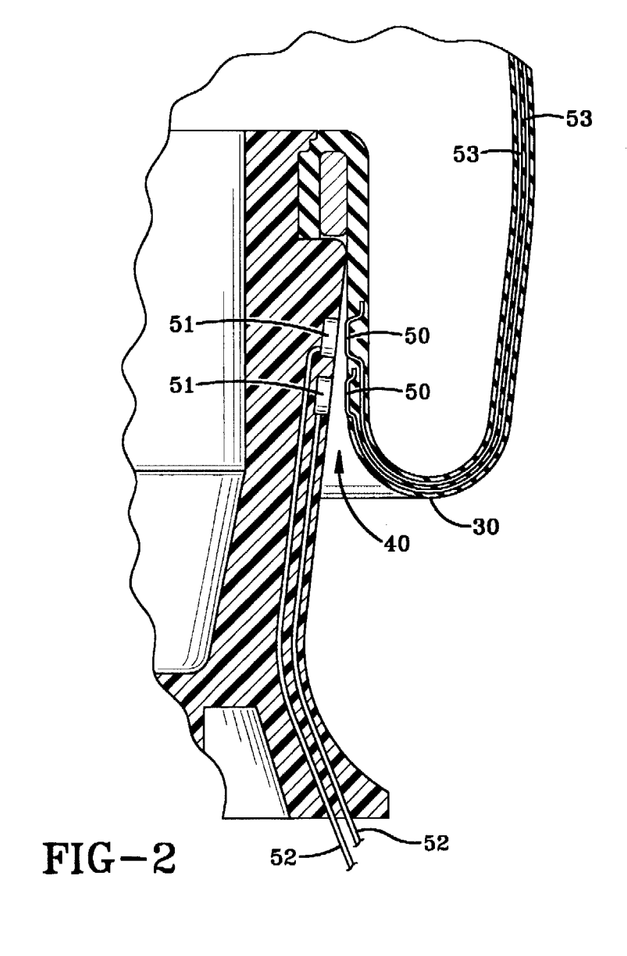
FIG. 2 is an enlarged fragmentary sectional view of the lower portion of an air spring showing another embodiment of the integral height sensor incorporated therein.

In the embodiment as is shown in FIG. 2, the air spring 10 contains a pair of sensors 40 vertically aligned. Each of the sensors has its own transmitter 50 and target 51 and is identical to those as described with reference to FIG. 1. In this case, sensors 50 work together in unison with the computer to determine the movement of the end plate 12 with reference to the piston 11 based upon the movement of the sleeve 13 in comparison to the piston 11.

In operation, as the upper transmitter on the upper sensor rises into alignment with the upper target on the upper sensor, the computer signals the pressurized fluid source to release fluid thereby returning the air spring to its at-rest position as shown in FIG. 2. In contrast, as the lower transmitter on the lower sensor drops into alignment with the lower target on the lower sensor, the computer signals the pressurized fluid source to add fluid thereby returning the air spring to its at-rest position as shown in FIG. 2.

Figure 3:
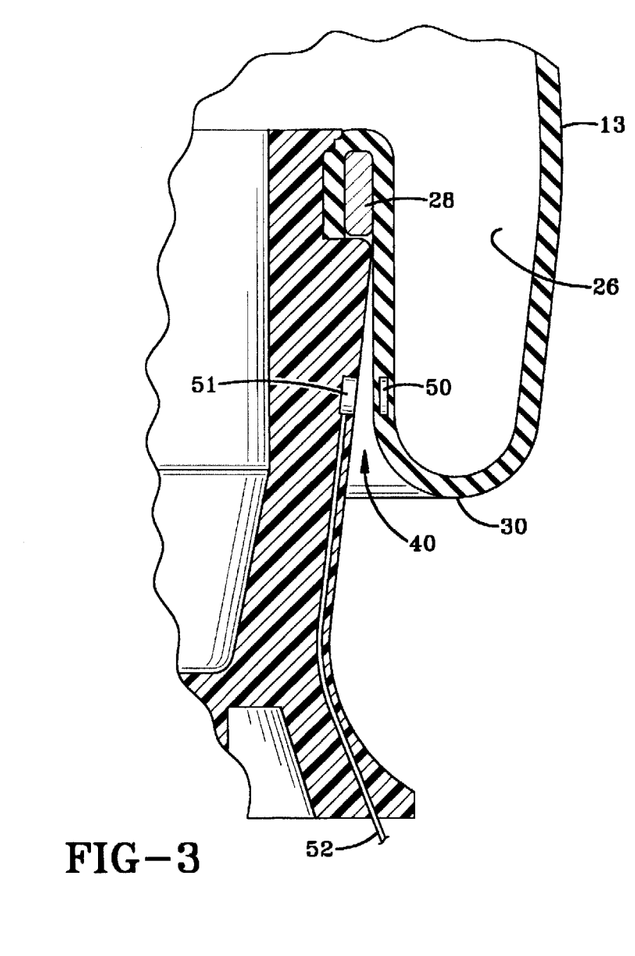
FIG. 3 is an enlarged fragmentary sectional view similar to FIG. 2 showing a third embodiment of the integral height sensor.

In the embodiment as is shown in FIG. 3, air spring 10 contains the same target 51 as described above with reference to FIG. 1. However, the transmitter is a microchip that communicates with the pressurized fluid source in a wireless manner. The microchip is molded or otherwise completely embedded within the sleeve 13.

Figure 4:
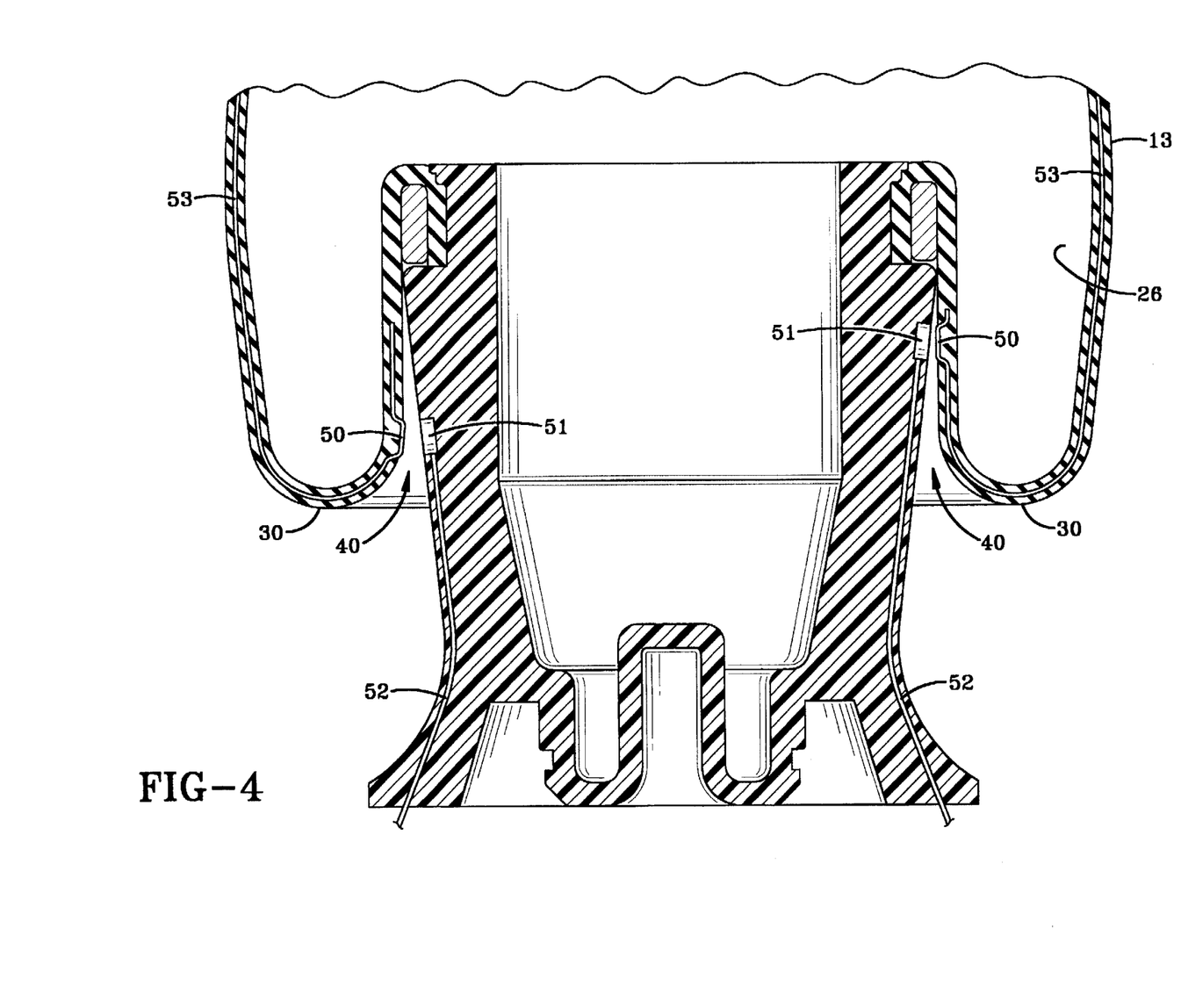
FIG. 4 is an enlarged fragmentary sectional vie of the lower portion of an air spring showing a fourth embodiment of the integral height sensor.

In the embodiment as is shown in FIG. 4, air spring 10 contains a pair of sensors 50 positioned at different heights along the sleeve circumferentially spaced from each other and not in linear vertical alignment as in FIG. 2. These sensors 50 function in the same manner as those described above with reference to FIG. 2. Similarly, these sensors are molded, embedded, affixed, or otherwise positioned in identical or similar manners as described above.

Figure 5:
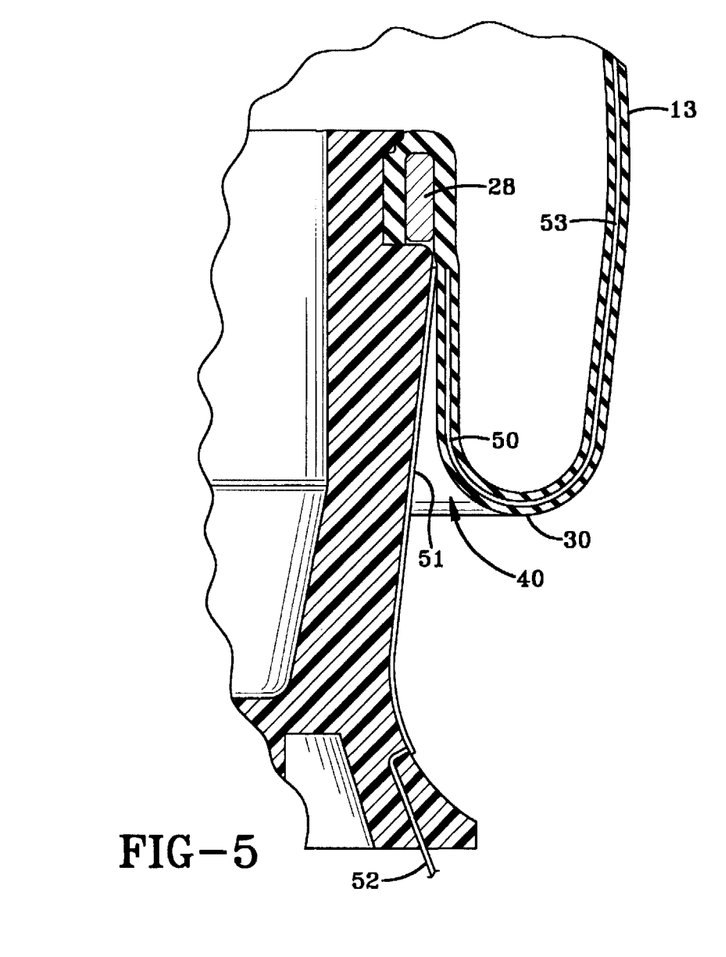
FIG. 5 is an enlarged fragmentary sectional view of the lower portion of an air spring showing a fifth embodiment of the integral height sensor.

In the embodiment as is shown in FIG. 5, air spring 10 contains a transmitter 50 embodied as an elongated thin metallic strip molded or otherwise embedded within the sleeve 13. The target is a similar elongated thin metallic strip that is affixed to the outer surface of the piston 11. It is further contemplated that the target strip could be embedded within the piston.

Figure 5A:
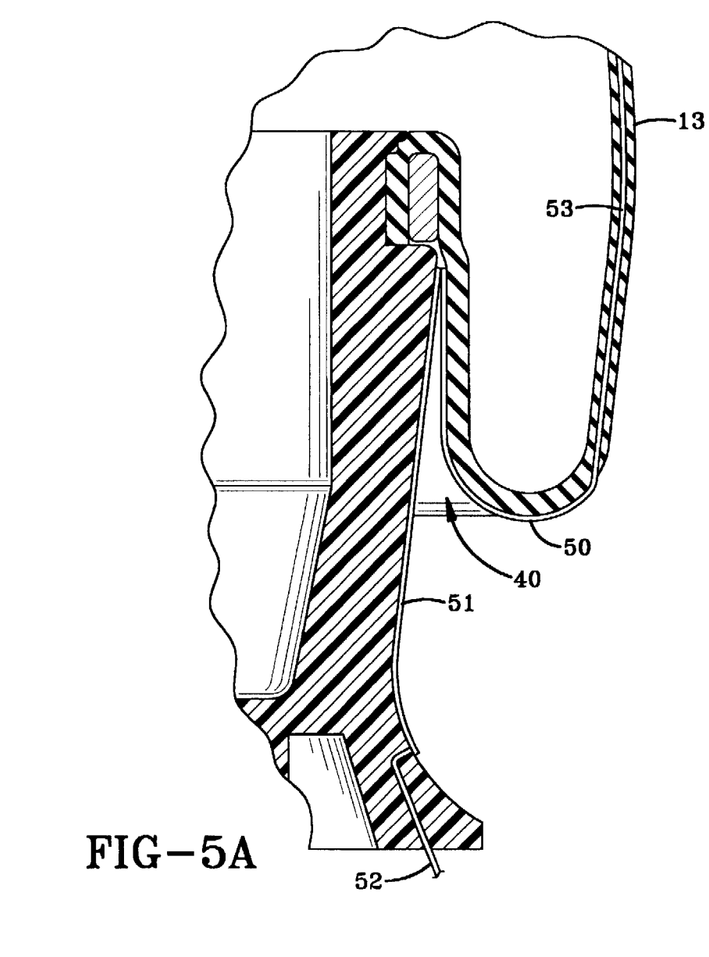
FIG. 5A is an enlarged fragmentary sectional view of the lower portion of an air spring showing an alternative version of the fifth embodiment of the integral height sensor.

In the embodiment as is shown in FIG. 5A, air spring 10 contains a thin strip of material containing electrically conductive carbon black and is affixed to the outer surface of the sleeve rather than molded or embedded therein. Height is sensed by change in resistance in the electric circuit.

Figure 6:
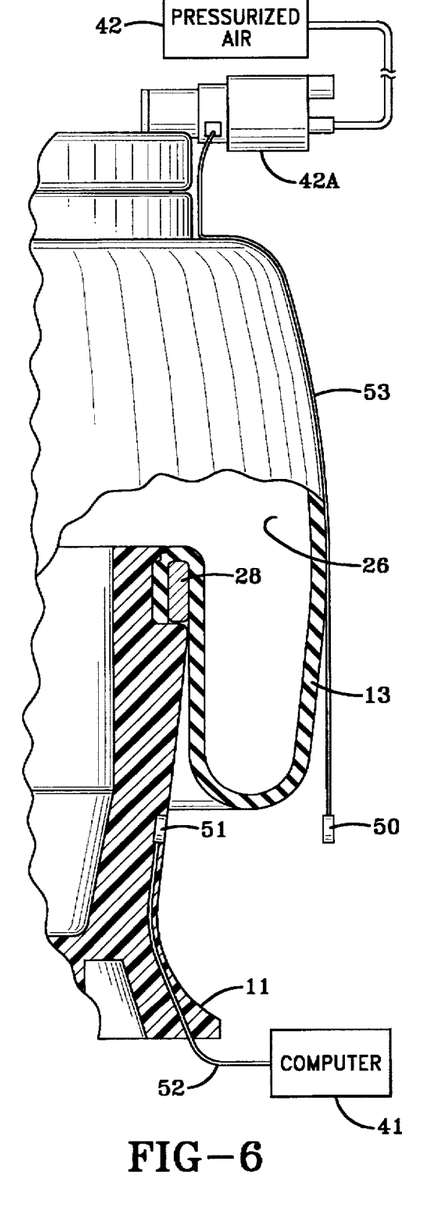
FIGS. 6 and 7 are fragmentary elevational views with portions broken away and in section showing a sixth embodiment of the integral height sensor in two operating positions.
Figure 7:
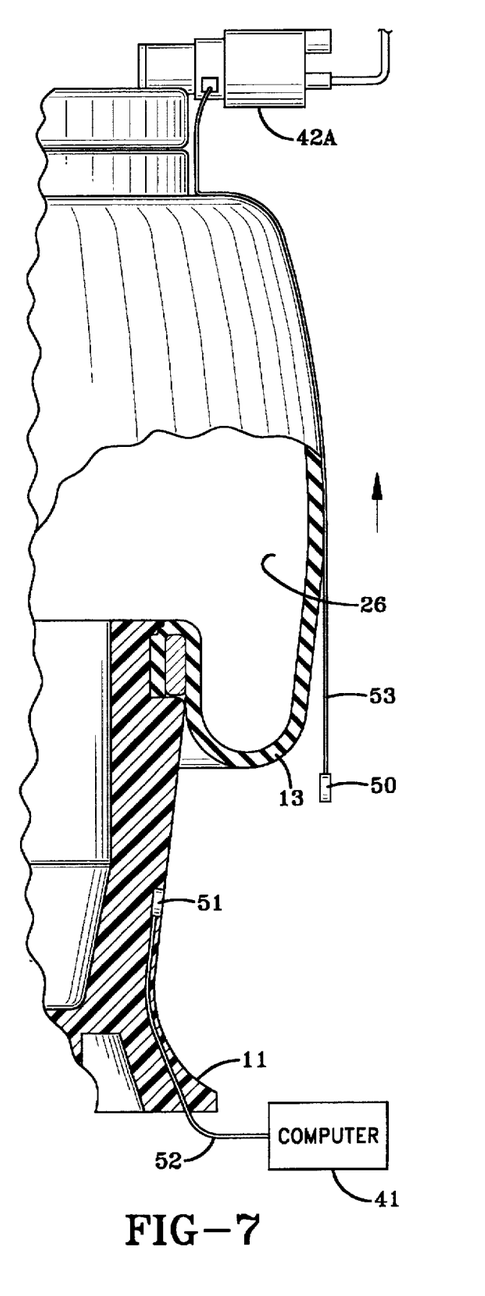

In the embodiment as is shown in FIG. 6, air spring 10 contains the same or similar transmitter and target as is shown and described with reference to FIG. 1 above except that the transmitter is not molded in, embedded or affixed to the sleeve. In contrast, the transmitter of the FIG. 6 embodiment rests and rides on the outer surface of the sleeve. The transmitter and target when aligned, as is the case when the air spring is at-rest as shown in FIG. 6, while the transmitter is shown in FIG. 7 as it moves away from the target as during a shock.

It is well within the above described embodiments, to reverse the positioning of the transmitters and targets such that the transmitters are formed on or within the piston 11 and the targets are formed on or within the sleeve 13.

In the foregoing description, certain terms have been used for brevity, clearness and understanding; but no unnecessary limitations are to be implied therefrom beyond the requirement of the prior art, because such terms are used for descriptive purposes and are intended to be broadly construed. Moreover, the description and illustration of the invention is by way of example, and the scope of the invention is not limited to the exact details shown or described.

Having now described the features, discoveries, and principles of the invention, the manner in which the improved air spring is constructed and used, the characteristic of the construction, and the advantageous, new and useful results obtained; the new and useful structures, devices, elements, arrangements, parts, and combinations are set forth in the appended claims.

I claim:

1. An air spring leveling system comprising:
   a pair of end members located in a generally axial spaced relationship when in an at-rest position, said end members being adapted to be mounted on spaced apart portions of a vehicle and movable towards and away from each other upon said vehicle to absorb road shocks as said vehicle encounters road shocks and to maintain said spaced apart vehicle portions at a predetermined spaced relationship when in said at-rest positions;
   a fluid pressure chamber formed between said end members by a flexible elastomeric sleeve having opposed open ends sealingly connected to said end members respectively, said flexible elastomeric sleeve being foldable partially over one of said end members thereby defining a covered region of said folded over end member and a corresponding covering region on the flexible elastomeric sleeve;
   a sensor for sensing relative distance between said end members and selectively producing a height sensed signal responsive thereto, said sensor being positioned within at least one of said covered region and said covering region when the system is in said at-rest position; and
   a pressurized fluid source fluidly connected to the fluid pressure chamber and electrically connected to a computer, the pressurized fluid source controlled by the height sensed signal from said sensor and the computer for regulating the amount of fluid within said fluid pressure chamber by controlling fluid entry and exit to maintain a predetermined axial separation between said end members when in said at-rest position.

2. The air spring leveling system of claim 1 wherein the sensor further comprises a transmitter and a target.

3. The air spring leveling system of claim 2 wherein the target functions as a sensor activator.

4. The air spring leveling system of claim 3 wherein the sensor further comprises electronic circuit means operatively connecting the transmitter to one of a computer and an electric power source, and the target to the other of the computer and the electric power source.

5. The air spring leveling system of claim 3 wherein at least one of the transmitter and the target is at least partially embedded in one of the covered region and the covering region, and the other is attached to the other of the covered region and the covering region.

6. The air spring leveling system of claim 5 wherein an electronic circuit means electrically connect the sensor to the computer, the electronic circuit means being at least partially embedded within the one of the covered region and the covering region that the sensor is embedded in.

7. The air spring leveling system of claim 5 wherein the transmitter comprises a microchip.

8. The air spring of claim 7 wherein the microchip is embedded in one of the end members, and the sensor activator is a metal strip.

9. The air spring leveling system of claim 5 wherein the transmitter comprises an optical sensor.

10. The air spring leveling system of claim 9 wherein the optical sensor is embedded within one of the end members, and the sensor activator is a reflector.

11. The air spring leveling system of claim 5 wherein the transmitter comprises a magnetic sensor.

12. The air spring leveling system of claim 11 wherein the magnetic sensor is embedded within one of the end members, and the sensor activator is an elongated metal strip.

13. The air spring leveling system of claim 5 wherein the sensor activator is a metal strip.

14. The air spring leveling system of claim 5 wherein the sensor activator is a conductive strip of polymer containing electrically conductive carbon black.

15. The air spring leveling system of claim 5 wherein the sensor activator is a reflector.

16. The air spring leveling system of claim 5 wherein the sensor activator is an insulated conductive means with an access window thereto thereby allowing magnetic waves to pass to the conductive means only through the window.

17. The air spring leveling system of claim 1 wherein the end members comprise an end plate and a piston member.

18. The air spring leveling system of claim 17 wherein the folded over end member is the piston member.

19. An air spring leveling system comprising:
   a rigid piston being adapted to be mounted on a first portion of a vehicle frame;
   a rigid end member adapted to be mounted on a second portion of the vehicle frame, said end member spaced apart from said piston;
   a flexible elastomeric sleeve having opposed ends sealingly connected to said piston and end member, respectively, thereby defining a fluid pressure chamber within the sleeve between said piston and end member;
   a pressurized fluid source connected to the fluid pressure chamber for regulating the amount of fluid within said chamber; and,
   a sleeve displacement sensor embedded within said piston outside of the fluid pressure chamber for sensing relative distance between said piston and end member, said sensor adapted to signal said pressurized fluid source to regulate fluid entry and exit to maintain a predetermined separation between said piston and end member.

20. The air spring leveling system of claim 19 wherein the flexible elastomeric sleeve being adapted to flex as the distance between said piston and end member changes during absorption of a shock as said vehicle frame encounters road shocks whereby the flexing includes rolling of the sleeve in part over the piston defining a covered region of said piston and a covering region of said sleeve.

21. The air spring leveling system of claim 19 further comprising electronic circuit means through which the sleeve displacement sensor signals the pressurized fluid source to regulate fluid entry and exit to maintain the predetermined separation between said piston and end member.

22. The air spring leveling system of claim 21 wherein the electronic circuit means is embedded in the piston and extends from the sensor to a computer.

23. The air spring leveling system of claim 21 further comprising an elongated conductive material substantially entirely embedded within the sleeve with the exception of an exposed portion in the configuration of a button for interacting with said sensor.

* * * * *